United States Patent
Misaka et al.

(10) Patent No.: US 12,437,138 B2
(45) Date of Patent: Oct. 7, 2025

(54) LAYOUT METHOD OF SEMICONDUCTOR CHIP, SEMICONDUCTOR CHIP MANUFACTURING METHOD AND COMPUTING DEVICE USING SAME

(71) Applicant: Samsung Electronics Co., Ltd., Suwon-si (KR)

(72) Inventors: Akio Misaka, Hwaseong-si (KR); Noyoung Chung, Hwaseong-si (KR); Taekyum Kim, Suwon-si (KR); Sanghwa Lee, Seoul (KR); Woonhyuk Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 549 days.

(21) Appl. No.: 17/961,710

(22) Filed: Oct. 7, 2022

(65) Prior Publication Data
US 2023/0205963 A1    Jun. 29, 2023

(30) Foreign Application Priority Data
Dec. 23, 2021 (KR) .......................... 10-2021-0185672

(51) Int. Cl.
*G06F 30/392*    (2020.01)
*G06F 30/398*    (2020.01)

(52) U.S. Cl.
CPC .......... *G06F 30/392* (2020.01); *G06F 30/398* (2020.01)

(58) Field of Classification Search
CPC .. G06F 30/392; G06F 30/398; G06F 2119/18; G03F 1/70; G03F 7/70441; H01L 21/027
See application file for complete search history.

(56) References Cited

U.S. PATENT DOCUMENTS

| | | | |
|---|---|---|---|
| 6,383,847 B1* | 5/2002 | Ditlow | ...................... G03F 1/00 438/361 |
| 7,010,775 B2 | 3/2006 | Ohmori | |
| | (Continued) | | |

FOREIGN PATENT DOCUMENTS

| | | |
|---|---|---|
| JP | 4282051 B2 | 6/2009 |
| KR | 100806779 B1 | 2/2008 |
| KR | 101678647 B1 | 11/2016 |

OTHER PUBLICATIONS

Kenji Harafuji, et al. "A Novel Hierarchical Approach for Proximity Effect Correction in Electron Beam Lithography", IEEE Transactions on Computer-Aided Design of Integrated Circuits and Systems, Oct. 1993, pp. 1508-1514, vol. 12, No. 10.
(Continued)

*Primary Examiner* — Nha T Nguyen
(74) *Attorney, Agent, or Firm* — Muir Patent Law, PLLC (57) ABSTRACT

A layout method of a semiconductor chip, includes designing a layout using a restriction rule such that a layout pattern having a length smaller than a first length in a first direction has to have a length smaller than a second length in a second direction, the second direction intersecting the first direction, generating a plurality of unit regions by partitioning the layout in the first direction, generating a plurality of target regions by adding a reference region to a partitioned edge of each of the plurality of unit regions, retargeting the plurality of target regions in parallel, and generating a correction layout by merging the plurality of retargeted target regions.

20 Claims, 10 Drawing Sheets

(56) References Cited

U.S. PATENT DOCUMENTS

| | | | |
|---|---|---|---|
| 7,346,882 B2 | 3/2008 | Abe | |
| 7,657,856 B1* | 2/2010 | Koshy | G06F 30/398 716/124 |
| 8,490,034 B1* | 7/2013 | Torunoglu | G03F 7/70441 716/55 |
| 8,601,409 B1* | 12/2013 | Chen | G03F 1/70 716/54 |
| 9,842,183 B1* | 12/2017 | Ginetti | G06F 30/39 |
| 9,904,753 B2 | 2/2018 | Kim et al. | |
| 10,983,429 B1 | 4/2021 | Lin | |
| 2004/0083475 A1 | 4/2004 | Todd et al. | |
| 2006/0168551 A1* | 7/2006 | Mukuno | G06F 30/394 257/E23.152 |
| 2007/0240086 A1* | 10/2007 | Sinha | G06F 30/398 716/54 |
| 2008/0222587 A1* | 9/2008 | Smayling | G06F 30/392 716/125 |
| 2009/0055792 A1* | 2/2009 | Itagaki | G06F 30/39 716/129 |
| 2010/0005434 A1* | 1/2010 | Wang | G06F 30/398 716/106 |
| 2010/0175040 A1* | 7/2010 | Meiring | G03F 1/36 716/52 |
| 2010/0198875 A1* | 8/2010 | Rieger | G06F 30/00 707/E17.001 |
| 2010/0306727 A1* | 12/2010 | Itagaki | G06F 30/39 716/122 |
| 2011/0029936 A1* | 2/2011 | Baek | G03F 1/36 716/50 |
| 2011/0202892 A1 | 8/2011 | Lee et al. | |
| 2011/0265048 A1* | 10/2011 | Kim | G06F 30/398 716/53 |
| 2012/0047473 A1* | 2/2012 | Reid | G06F 30/39 716/53 |
| 2014/0007026 A1* | 1/2014 | Chen | G06F 30/398 716/55 |
| 2014/0068529 A1* | 3/2014 | Agarwal | G03F 7/70441 716/54 |
| 2014/0189616 A1* | 7/2014 | Rieger | G06F 30/00 716/55 |
| 2015/0046887 A1* | 2/2015 | Sun | G06F 30/39 716/52 |
| 2016/0188781 A1* | 6/2016 | Hamouda | G03F 1/70 716/53 |
| 2020/0019670 A1* | 1/2020 | Chang | G03F 1/70 |
| 2020/0081352 A1* | 3/2020 | Kim | G03F 1/36 |
| 2020/0134125 A1* | 4/2020 | Huang | G06F 30/392 |
| 2021/0208499 A1* | 7/2021 | Bai | G03F 1/36 |
| 2025/0190674 A1* | 6/2025 | Niewczas | G06F 30/398 |

OTHER PUBLICATIONS

Mihir Parikha, et al. "Corrections to Proximity Effects in Electron Beam Lithography", Journal of Applied Physics, 1979, pp. 4378-4382, vol. 50.

Akio Misaka, et al. "Hierarchical Proximity Effect Correction for E-Beam Direct Writing of 64-Mbit DRAM", SPIE vol. 1465 Electron-Beam, X-Ray, and Ion-Beam Submicrometer Lithographies for Manufacturing (1991), pp. 174-184.

* cited by examiner

|  | COMPARATIVE EXAMPLE | INVENTIVE EXAMPLE | | |
|---|---|---|---|---|
|  | RETARGET (S201~S206) | RETARGET (S21~S23) | MERGE (S25) | TOTAL (S21~S25) |
| M1 | 29.06 [hr] | 4.21 [hr] | 3.03 [hr] | 7.24 [hr] |
| M2 | 42.84 [hr] | 4.81 [hr] | 1.26 [hr] | 6.07 [hr] |
| M3 | 33.67 [hr] | 4.34 [hr] | 1.63 [hr] | 5.97 [hr] |

LAYOUT METHOD OF SEMICONDUCTOR CHIP, SEMICONDUCTOR CHIP MANUFACTURING METHOD AND COMPUTING DEVICE USING SAME

CROSS-REFERENCE TO RELATED APPLICATION(S)

This application claims benefit of priority to Korean Patent Application No. 10-2021-0185672 filed on Dec. 23, 2021 in the Korean Intellectual Property Office, the disclosure of which is incorporated herein by reference in its entirety.

BACKGROUND

Aspects of the present inventive concept relate to a layout method of a semiconductor chip, as well as a method for manufacturing the semiconductor chip and a computing device, using the same.

In general, patterns of a semiconductor chip may be formed by an exposure process and an etching process. First, a layout for a pattern of a semiconductor chip to be formed on a wafer may be designed. When a circuit pattern on a mask is transferred onto the wafer by an exposure process to form a circuit pattern (hereinafter, "a transferred circuit pattern") on the wafer, a disparity may be created between the transferred circuit pattern on the wafer and an actually designed circuit pattern. Such a disparity may be due to an optical proximity effect in the exposure process, a loading effect in the etching process, or the like.

As a method for accurately transferring a circuit pattern on a mask onto a wafer, a process proximity correction (PPC) technique, in consideration of deformation of a transferred circuit pattern on the wafer, may be used. The process proximity correction technology may predict and analyze an optical proximity effect and a loading effect in advance, and may correct a layout of the circuit pattern on the mask according to the analysis result, and a retargeting process or an optical proximity correction (OPC) process may be used.

SUMMARY

An aspect of the present inventive concept is to improve parallelism of a retargeting operation, and shorten a turnaround time (TAT) of mask data preparation.

According to an aspect of the present inventive concept, a layout method of a semiconductor chip includes designing layout using a restriction rule such that a layout pattern having a length smaller than a first length in a first direction has to have a length smaller than a second length in a second direction, the second direction intersecting the first direction; generating a plurality of unit regions by partitioning the layout in the first direction; generating a plurality of target regions by adding a reference region to a partitioned edge of each of the plurality of unit regions; retargeting the plurality of target regions in parallel; and generating a correction layout by merging the plurality of retargeted target regions.

According to an aspect of the present inventive concept, a method for manufacturing a semiconductor chip, includes designing layouts of layers of the semiconductor chip using a restriction rule, such that a layout pattern having a length smaller than a first length in a reference direction has to have a length smaller than a second length in a direction perpendicular to the reference direction; generating correction layouts by partitioning each of the layouts in the reference direction, retargeting partitioned regions in parallel, and merging the retargeted regions; generating final layouts by performing optical proximity correction (OPC) and fracturing on the correction layout s, and preparing masks of the layers using the final layouts; and manufacturing the semiconductor chip using the masks.

According to an aspect of the present inventive concept, a computing device for retargeting a layout of a semiconductor chip includes a memory storing at least one instruction; and a processor including a plurality of processing cores, wherein the processor is configured to use a restriction rule that limits a length of a layout pattern in a first direction to design a layout, partition the layout in a second direction, intersecting the first direction, to generate a plurality of target regions, and retarget each of the plurality of target regions in parallel.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, example embodiments of the present inventive concept will be described with reference to the accompanying drawings.

Figure 1:
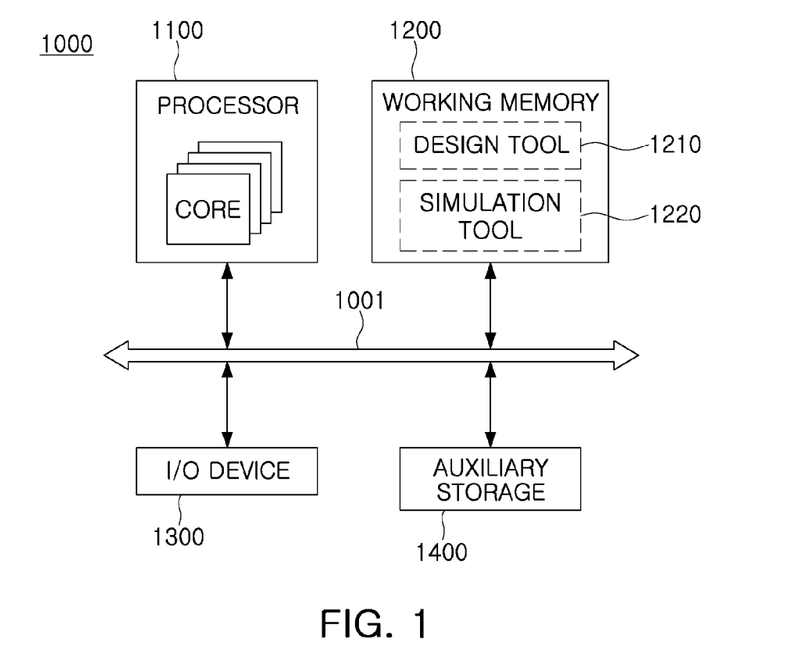
FIG. 1 is a block diagram illustrating a computing system retargeting a layout pattern of a semiconductor according to an embodiment of the present inventive concept.

FIG. 1 is a block diagram illustrating a computing system 1000 performing optical proximity correction (OPC) according to an embodiment of the present inventive concept. Referring to FIG. 1, a computing system 1000 may include at least one processor 1100 connected to a system bus 1001, a working memory 1200, an input/output device 1300, and an auxiliary storage device 1400.

The computing system 1000 may be provided as a dedicated device for generating/correcting a layout pattern or as a dedicated device for performing a semiconductor design including the generating/correcting the layout pattern. For example, the computing system 1000 may include various design and verification simulation programs. The processor 1100, the working memory 1200, the input/output device 1300, and the auxiliary storage device 1400 may be electrically connected through the system bus 1001, and may exchange data with each other through the system bus 1001. A configuration of the system bus 1001 is not limited to the above description, and may further include a mediation means for efficient management.

The processor 1100 may be implemented to execute at least one instruction. For example, the processor 1100 may be implemented to execute software (e.g., application programs, operating systems, and device drivers) to be executed in the computing system 1000. The processor 1100 may execute an operating system that may be loaded into the working memory 1200. The processor 1100 may execute various application programs to be driven based on the operating system. For example, the processor 1100 may be a central processing unit (CPU), a microprocessor, an application processor (AP), or any processing device similar thereto.

The processor 1100 may include a plurality of processing cores. A plurality of processing cores may execute instructions in parallel (i.e., concurrently), to quickly execute various application programs.

The working memory 1200 may be implemented to store at least one instruction. For example, an operating system or applications may be loaded into the working memory 1200. When the computing system 1000 is booted, an OS image stored in the auxiliary storage device 1400 may be loaded into the working memory 1200, based on a boot sequence. All input/output operations of the computing system 1000 may be supported by the operating system. Similarly, to be selected by a user or to provide basic services, applications may be loaded into the working memory 1200. In particular, as described above, a design tool 1210 for designing a semiconductor or a simulation tool 1220 for correcting a layout pattern in consideration of an optical proximity effect may be loaded into the working memory 1200 from the auxiliary storage device 1400.

In addition, the working memory 1200 may be a volatile memory, such as a dynamic random access memory (DRAM), a static memory access memory (SRAM), or the like, or may be a non-volatile memory, such as a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The design tool 1210 may perform a function of changing shapes and positions of specific layout patterns have shapes and positions defined by a design rule (DR). Also, the design tool 1210 may perform a design rule check (DRC) under changed bias data conditions.

The simulation tool 1220 may retarget a layout pattern, and may perform OPC for the layout pattern. Retargeting is a rule-assisted modification of the shapes and positions of features included in the layout pattern to improve their process window. For example, the retargeting may include correcting shapes and positions of features (e.g., metal patterns) to reduce an error due to an optical proximity effect in an exposure process to apply a bias to upper and lower metal patterns. In addition, the OPC may include an operation of correcting a rectangular layout pattern into any one shape among a plurality of OPC shapes according to a condition.

The input/output device 1300 may control user input and output from user interface devices. For example, the input/output device 1300 may include input means such as a keyboard, a keypad, a mouse, a touch screen, or the like, to receive information from a designer. Using the input/output device 1300, the designer may receive information on semiconductor regions or data paths that require adjusted operating characteristics. In addition, the input/output device 1300 may include an output means such as a printer, a display, or the like to display a processing process result, or the like, of the design tool 1210 or the simulation tool 1220.

The auxiliary storage device 1400 may be provided as a storage medium of the computing system 1000. The auxiliary storage device 1400 may store application programs, an OS image, or various data. The auxiliary storage device 1400 may be provided to form a mass storage device, such as a memory card (e.g., an MMC, an eMMC, an SD card, a Micro SD card, or the like), a hard disk drive (HDD), a solid state drive (SSD), a universal flash storage (UFS), or the like.

When a mask data preparation (MDP) operation including the retargeting, the OPC, or the like is processed in parallel (i.e., concurrently) using the processing cores of the processor 1100, a turnaround time (TAT) of the mask data preparation operation may be shortened. To achieve parallel distributed processing of the mask data preparation operation, layout data should be able to be divided into independent portions. For example, when layout data is divided into a first portion and a second portion, it should be possible to complete a target operation applied to data of the first portion without referring to data of the second portion.

A simple method to partition layout data may be to divide a layout into several smaller regions. However, when the layout is divided into arbitrary regions without considering lengths of patterns included in the layout, it may be difficult to smoothly perform parallel distributed processing of each of the regions. For example, when the layout is divided into arbitrary regions, a pattern that spans a plurality of regions may be arbitrarily cut due to having a long length. When a retargeting operation is performed on a region including a portion of the cut pattern, it may be necessary to refer to data for another region including a remaining portion of the cut pattern. In this case, it may be difficult to independently retarget the corresponding region.

According to an embodiment of the present inventive concept, a plurality of target regions that may be independently retargeted may be generated by designing a layout based on a restriction rule regarding a length of a pattern in a first direction and a second direction, and partitioning the design layout in a predetermined direction. According to an embodiment of the present inventive concept, since a retargeting operation may be independently performed on a plurality of regions, parallel processing performance of the retargeting operation may be improved and a TAT of the mask data preparation operation may be shortened.

Figure 2:
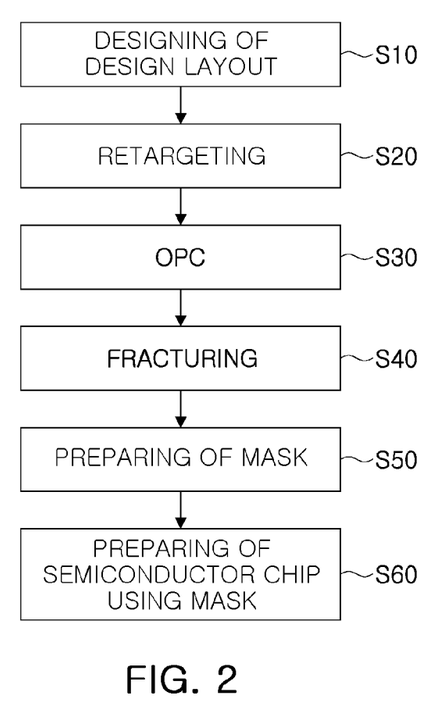
FIG. 2 is a flowchart illustrating a method of manufacturing a semiconductor chip according to an embodiment of the present inventive concept.

FIG. 2 is a flowchart illustrating a method of manufacturing a semiconductor chip according to an embodiment of the present inventive concept.

Referring to FIG. 2, a method of manufacturing a semiconductor chip may include designing a design layout of the semiconductor chip (S10), retargeting the design layout (S20), performing optical proximity correction (OPC) for the retargeted layout (S30), fracturing the design layout corrected by the retargeting and the OPC (S40), preparing a mask using the fractured layout (S50), and preparing the semiconductor chip using the mask (S60).

In designing a design layout of the semiconductor chip (S10), a design layout corresponding to a circuit pattern of the semiconductor chip to be formed on a wafer may be provided from a host computer or a server of a semiconductor manufacturing facility. Specifically, the design layout may be a physical representation of a circuit designed for the semiconductor chip that may be transferred onto the wafer, and may include a plurality of patterns. For example, the design layout may be provided as coordinate values of contours of the patterns constituting the design layout from a computer aided design (CAD) system. In particular, the patterns may include multiple patterns in which the same shape is repeated, and the patterns may be provided to have a combination of polygons such as a triangle or a quadrangle.

According to an embodiment of the present inventive concept, a design layout may be designed using a restriction rule on a length of a pattern. For example, the restriction rule may include a rule such that a layout pattern having a length smaller than a first length in a first direction has to have a length smaller than a second length in a second direction intersecting the first direction.

Retargeting the design layout (S20) may include correcting shapes and positions of patterns in order to reduce an error of the design layout due to an optical proximity effect. To reduce the error due to the optical proximity effect, an effect of the optical proximity effect between adjacent patterns at a short distance should also be considered, but an effect in which a long pattern or interconnected patterns at a long distance are affected should also be considered comprehensively. The effect of patterns located at a short distance from each other may be referred to as a short-range interaction, and the effect of the long pattern or the interconnected patterns may be referred to as a long-range interaction. When dividing the layout into a plurality of regions to perform the retargeting in parallel, and patterns that may cause the long-range interaction are cut arbitrarily, the retargeting may not be performed normally.

According to an embodiment of the present inventive concept, a layout designed using the restriction rule may be partitioned into a plurality of regions, and retargeting of the plurality of regions may be performed in parallel. For example, patterns of the layout designed using the restriction rule may have a limited length in the second direction. For example, the patterns of the layout may have less long-range interaction in the second direction. Therefore, when the layout is cut in the first direction and divided into a plurality of regions, a problem in which patterns causing the long-range interaction are arbitrarily cut may be prevented. Therefore, a retargeting operation may be independently performed on the plurality of partitioned regions, and parallel processing performance of the retargeting operation may be improved.

The performing optical proximity correction (OPC) for the retargeted layout (S30) may include changing shapes of patterns included in the design layout in order to reduce an error caused by an optical proximity effect. As a pattern is miniaturized, an optical proximity phenomenon may occur due to influence between adjacent patterns during an exposure process.

Therefore, it is possible to suppress occurrence of the optical proximity effect by performing optical proximity correction for correcting the design layout. For example, the optical proximity correction may include expanding an overall size of patterns constituting the design layout, and processing corner portions of the patterns. For example, the optical proximity correction may include moving edges of each of the patterns or adding additional polygons. By the optical proximity correction, a distortion phenomenon of a pattern due to diffraction, interference, or the like of light generated during an exposure process may be corrected, and an error due to a pattern density may be corrected. After the optical proximity correction, verification of the optical proximity correction may be further performed. In the OPC (S30), a short-range interaction between adjacent patterns may be considered, but a long-range interaction may not be considered.

Fracturing the corrected design layout (S40) may include dividing the design layout into polygons according to a shape of an electron beam. This may be because, when performing an exposure process, the shape of the electron beam may be limited to a certain polygonal shape such as a quadrangle or a triangle.

Final design layout data, corrected by the retargeting and the OPC, and fractured, may be sent to an exposure facility for manufacturing a mask to be used in an exposure process, such as a photomask and an electron beam mask. Preparing a mask using the corrected design layout (S50) may comprise manufacturing of the mask according to corrected design layout data. The mask may be manufactured by performing an exposure process on a mask substrate using the corrected design layout data. After the exposure process, a series of processes such as development, etching, cleaning, baking, and the like may be further performed to form a mask. According to an embodiment, before transmitting the corrected design layout data, verification for the corrected design layout data may be further performed.

Preparing the semiconductor chip using the mask (S60) may include performing an exposure process using the mask. The semiconductor chip may include a volatile memory such as a dynamic random access memory (DRAM), a static random access memory (SRAM), or the like, or a non-volatile memory such as a flash memory or the like, and may include a logic semiconductor device such as a microprocessor, for example, a central processing unit (CPU), a controller, an application specific integrated circuit (ASIC) and the like. In particular, the semiconductor chip may be manufactured by performing a process of forming second repeating patterns on a lower structure including first repeating patterns. The second repeating patterns may be formed by aligning the first repeating patterns in high accuracy by the mask. The semiconductor chip may be finally manufactured by further performing a deposition process, an etching process, an ion process, a cleaning process, and the like, in addition to the exposure process.

Figure 3:
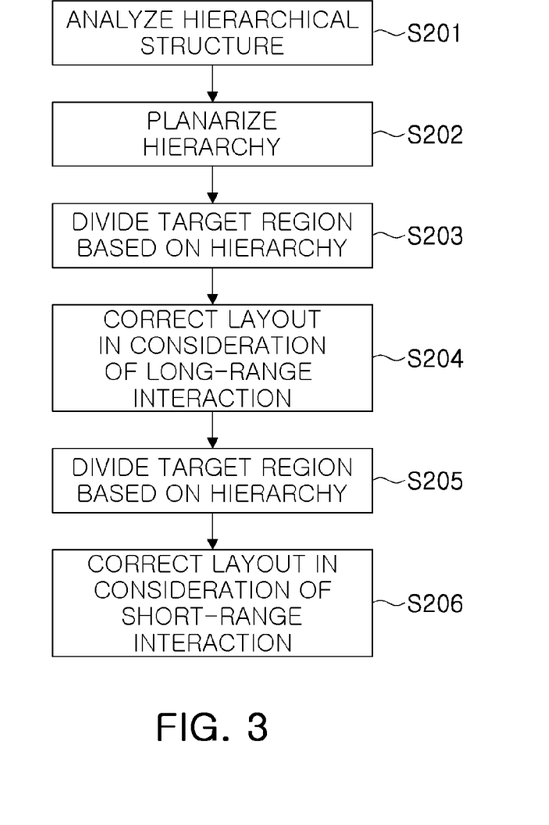
FIG. 3 is a flowchart illustrating the retargeting method illustrated in FIG. 2.
Figure 4A:
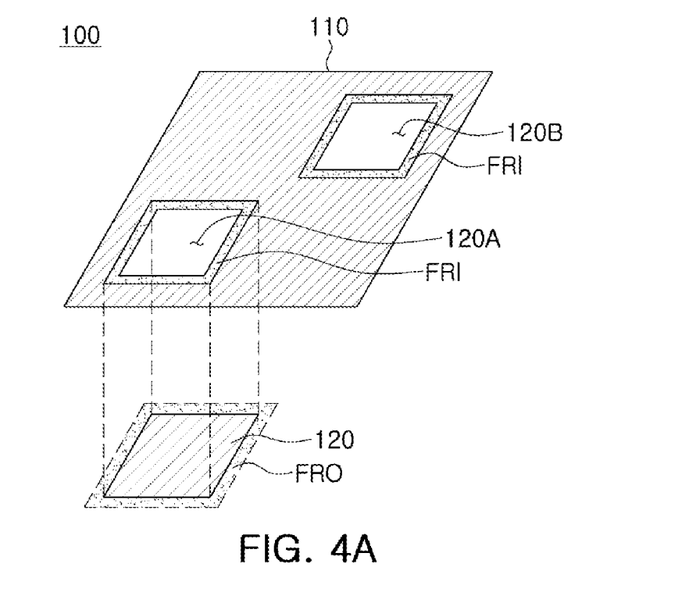
FIGS. 4A to 4C are views illustrating the retargeting method illustrated in FIG. 3.
Figure 4B:
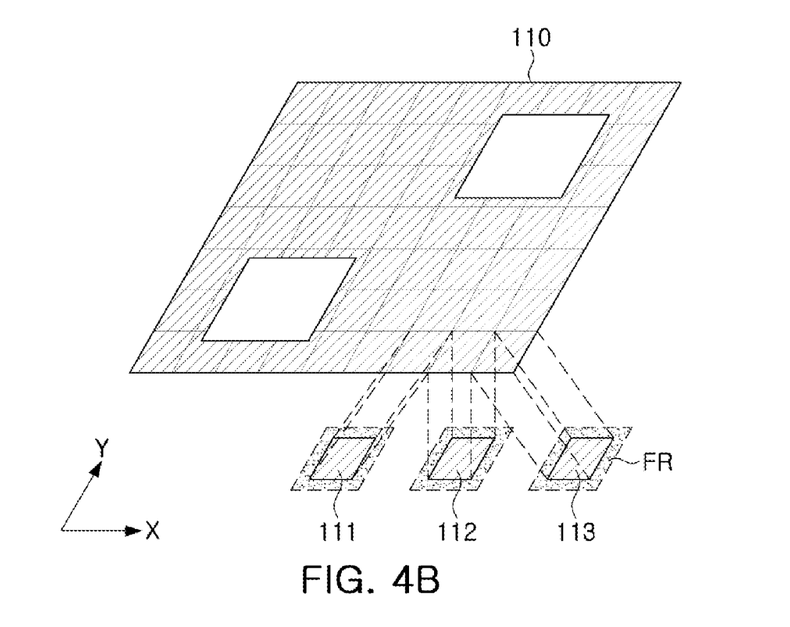
Figure 4C:
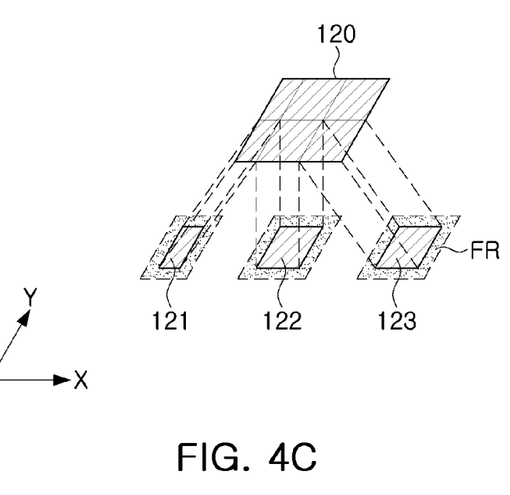

A method of performing retargeting in consideration of a long-range interaction and a short-range interaction of layout patterns may be described in detail in FIGS. 3 to 4C. Specifically, FIG. 3 is a flowchart illustrating a retargeting method. FIGS. 4A to 4C are views illustrating a retargeting method.

First, referring to FIG. 3, a hierarchical structure of a retargeting target layout region, i.e., a target region may be analyzed (S201). Analyzing the hierarchical structure of the target region may include checking a connection relationship between patterns included in the target region.

A layout may be designed to have the hierarchical structure. For example, when the layout is designed by arranging and connecting predefined standard cells, an entire region and standard cell regions of the layout may have a hierarchical structure above and below each other. The layout may include lower regions, and an upper region excluding the lower regions from an entire layout region.

After the hierarchical structure of the target region is analyzed, a hierarchy of the target region may be planarized (S202). The planarization of the hierarchy may refer to changing the hierarchical structure such that patterns connected to each other in the target region belong to a single lower region or a single upper region. When the hierarchy of the target region is planarized, connections between all patterns belonging to a certain region may be completed in the corresponding region. Since patterns in different regions may have an independent connection relationship, an operation of correcting a layout in consideration of a long-range interaction due to an optical proximity effect may be independently performed for each region.

After the hierarchy of the target region is planarized, the target region may be divided according to the hierarchy (S203). Referring to FIG. 4A, a target region 100 may include cells 120A and 120B, which may be lower hierarchies. According to an embodiment, the cells 120A and 120B may include patterns, identical to each other. The target region 100 may be divided into an upper region 110 and a lower region 120. The upper region 110 may refer to a region in which the cells 120A and 120B, which may be lower hierarchies, are excluded from the target region 100. The lower region 120 may refer to a region including patterns of one cell among cells 120A and 120B, which may be lower hierarchies.

After the target region is divided, the layout may be corrected in consideration of a long-range interaction with respect to the divided regions (S204). In the embodiment of FIG. 4A, a long-range interaction may be considered independently for the upper region 110 and the lower region 120.

To consider a short-range interaction between adjacent regions when correcting the layout with respect to the divided regions, a portion of patterns of adjacent regions may be referenced. FIG. 4A illustrates an inner frame (FRI) added in the upper region 110 to reference a pattern of the lower region 120, and an outer frame (FRO) added in the lower region 120 to reference a pattern of the upper region 110.

When the layout is corrected in consideration of a long-range interaction in the upper region 110 and the lower region 120, each of the hierarchically partitioned regions may be partitioned based on a region, to correct the layout in consideration of a short-range interaction (S205). Referring to FIG. 4B, an upper region 110 may be partitioned in the first direction (X) and second direction (Y) to generate a plurality of sub-regions. Referring to FIG. 4C, a lower region 120 may be also partitioned in the first direction (X) and second direction (Y) to generate a plurality of sub-regions.

When dividing based on a region is completed, a layout of each of the divided regions may be corrected in consideration of a short-range interaction (S206). FIG. 4B illustrates sub-regions 111, 112, and 113 partitioned from the upper region 110. Layouts of the sub-regions 111, 112, and 113 may be corrected independently of each other. A reference frame FR for referring to a pattern of an adjacent region may be added to each of the sub-regions 111, 112, and 113. FIG. 4C illustrates sub-regions 121, 122, and 123 partitioned from the lower region 120. Layouts of the sub-regions 121, 122, and 123 may also be corrected independently of each other. When the operation of S206 is performed and the correction layouts of regions are merged, a retargeting operation for the target region 100 may be completed.

As described with reference to FIG. 3, the correcting the layout in consideration of the short-range interaction (S206) may be performed independently for a plurality of regions. For example, the operation of S206 may be divided into several independent operations for parallel (i.e., concurrent) processing. In the correcting the layout in consideration of the long-range interaction, the operation of S204 may be difficult to be divided, since a large area should be comprehensively considered. In the embodiment of FIG. 4A, when the target region 100 is partitioned into the upper region 110 and the lower region 120, the operation of S204 may be divided into only two operations.

According to an embodiment of the present inventive concept, a layout may be designed under a set restriction rule, and the layout may be partitioned into a plurality of target regions that may be retargeted independently of each other. According to this embodiment of the present inventive concept, the operation of S204 may be divided into a plurality of operations, and parallel processing performance of a retargeting operation may be improved.

FIGS. 5 to 8 are views illustrating a semiconductor layout method according to an embodiment of the present inventive concept.

Figure 5:
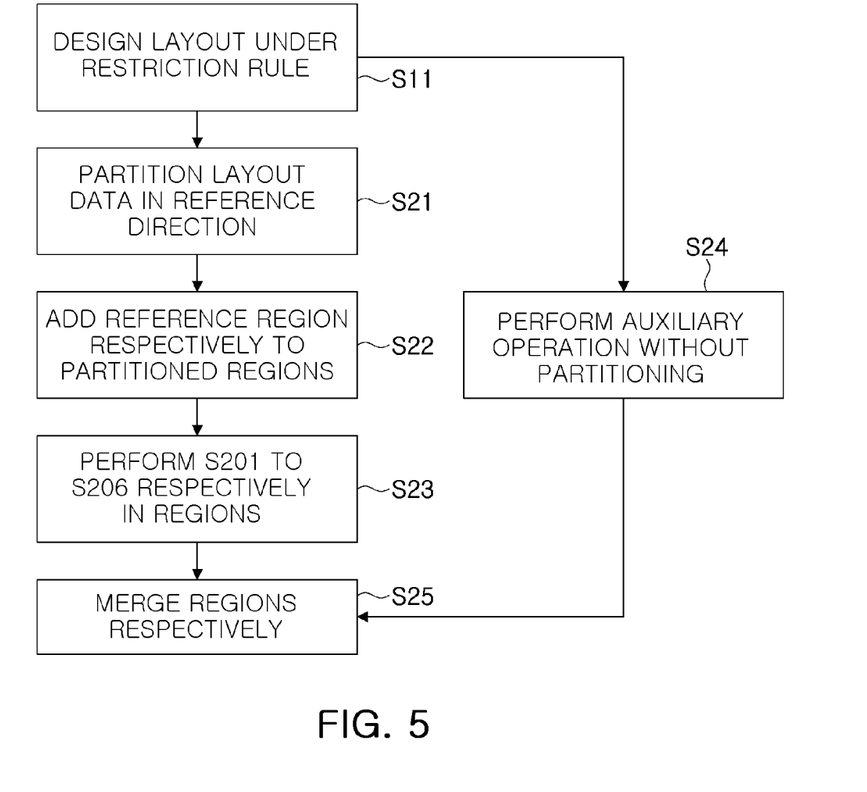
FIG. 5 is a flowchart illustrating a semiconductor layout method according to an embodiment of the present inventive concept.

FIG. 5 is a flowchart illustrating a semiconductor layout method according to an embodiment of the present inventive concept.

First, an original layout may be designed under a restriction rule to be set (S11). According to an embodiment of the present inventive concept, the restriction rule may set forth that a layout pattern having a length smaller than a first length in a reference direction is designed to have a length smaller than a second length in a direction perpendicular to the reference direction. The restriction rule may be defined as a design rule or the like, and may be applied when designing a layout.

Figure 6A:
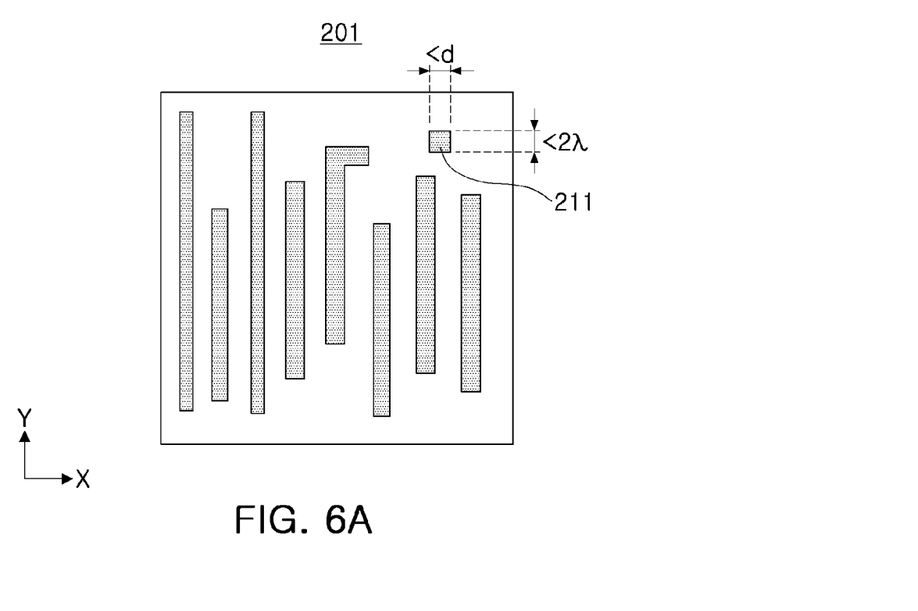
FIGS. 6A, 6B, 7, and 8 are views illustrating a semiconductor layout method, in detail, according to an embodiment of the present inventive concept.
Figure 6B:
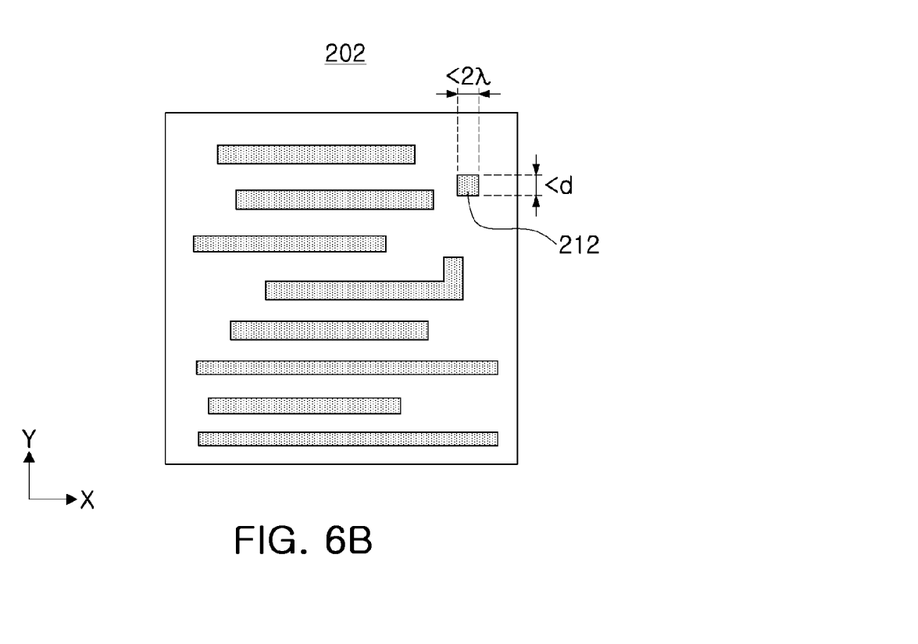

FIG. 6A and FIG. 6B are views illustrating a restriction rule according to an embodiment of the present inventive concept.

FIG. 6A mainly illustrates a first original layout 201 having a plurality of patterns extending in the second direction (Y), for example, in a longitudinal direction. When patterns in an original layout are mainly extending in the second direction (Y) (e.g., a majority of the patterns each have a length in the second direction (Y) greater than a length in the first direction (X)), a layout may be designed according to a restriction rule limiting lengths of the patterns in the first direction (X), for example, in a horizontal direction.

In the first original layout 201, a layout pattern 211 having a length smaller than a first length $2\lambda$ in the second direction (Y) may be designed to have a length smaller than a second length d in the first direction (X). In this case, $\lambda$ may be refer to an exposure wavelength of exposure equipment used in an exposure process. The layout pattern having a length smaller than a first length $2\lambda$ in the second direction (Y) may be a fine pattern, and may be a pattern which may be greatly affected by an optical proximity effect. When the original layout is partitioned to cut the fine pattern, and retargeting is performed with the cut fine pattern in a certain region, an effect of the optical proximity effect may not be accurately reflected in the retargeted fine pattern.

Therefore, according to an embodiment of the present inventive concept, when designing a layout, a length of a fine pattern in the first direction (X) may be limited to be smaller than a second length d. The second length d may be determined according to a design. For example, the second length d may be determined based on a unidirectional interaction distance considered in OPC. For example, the second length d may be determined to be about 2 μm.

A pattern having a length in the second direction (Y) greater than or equal to the first length $2\lambda$ in the reference direction (i.e., the second direction (Y)) may not have a large effect of the optical proximity effect in the second direction, and even when the pattern is cut in the first direction (X), there may be no problem in performing accurate retargeting. Therefore, a restriction to length in the second direction (Y) may not be applied to a pattern having a length greater than or equal to the first length $2\lambda$.

FIG. 6B mainly illustrates a second original layout 202 having a plurality of patterns extending in the first direction (X) (i.e., reference direction), for example, in the horizontal direction. When patterns in an original layout are mainly extending in the first direction (X) (e.g., a majority of the patterns each have a length in the first direction (X) greater than a length in the second direction (Y)), a layout may be designed according to a restriction rule limiting lengths of the patterns in the second direction (Y), for example, in the longitudinal direction. In the second original layout 202, a layout pattern 212 may be designed to have a length smaller than a first length 2λ in the first direction (X), i.e., a length smaller than a second length d in the second direction (Y). In this case, λ and d may be the same as described with reference to FIG. 6A.

A semiconductor chip may include a plurality of layers. To manufacture the semiconductor chip, for each of the layers, a layout may be generated, and a mask may be generated. As illustrated with respect to FIG. 6A and FIG. 6B, "reference directions" of layouts corresponding to the layers may be different from each other. For example, when layout patterns of a first metal layer mainly extend in the first direction (X), a reference direction of a layout of the first metal layer may be the first direction (X). In addition, layout patterns of a second metal layer, adjacent to an upper surface of the first metal layer, may extend in the second direction (Y), perpendicular to the first direction (X), and a reference direction of a layout of the second metal layer may be the second direction (Y).

Referring to FIG. 5 again, after the original layout is designed, the original layout may be partitioned in a reference direction (S21). A plurality of target regions may be generated by adding a reference region respectively to a plurality of unit regions generated by partitioning the original layout in the reference direction (S22).

Figure 7:
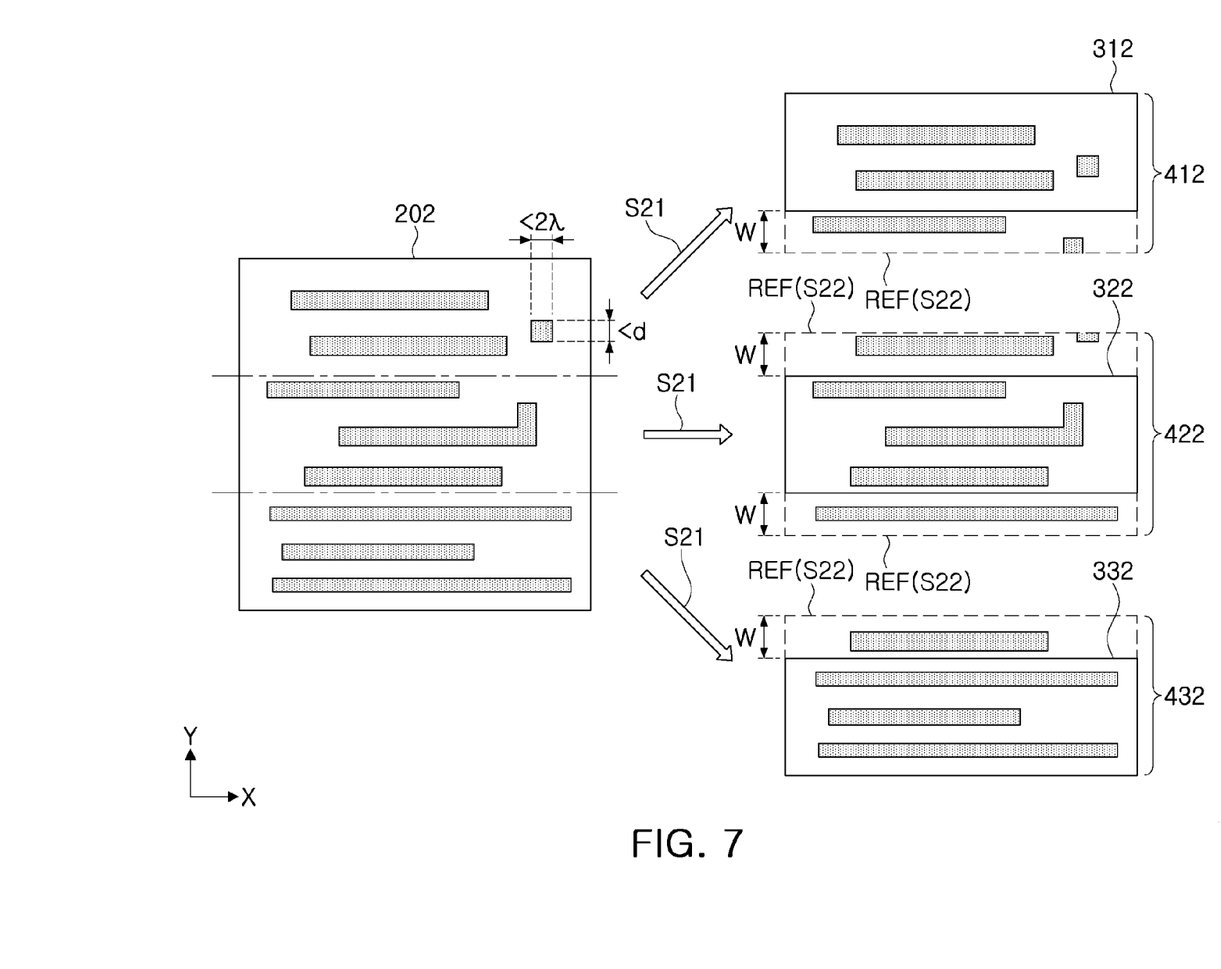

FIG. 7 is a view illustrating operations of S21 and S22 according to an embodiment of the present inventive concept.

In the embodiment of FIG. 7, an original layout 202 may be partitioned in a reference direction. The original layout 202 illustrated in FIG. 7 may be the same as the second original layout 202 described with reference to FIG. 6B. For example, patterns of the original layout 202 may mainly extend in the first direction (X). When the patterns mainly extend in the first direction (X), the original layout 202 may be partitioned in the first direction (X) as the reference direction (S21). FIG. 7 illustrates a plurality of unit regions 312, 322, and 332 generated by partitioning the original layout 202 in the reference direction.

Reference regions REF may be added to edges partitioned in the plurality of unit regions 312, 322, and 332, to generate target regions 412, 422, and 432 for retargeting (S22). A reference region REF may include a pattern of at least a portion of an adjacent unit region.

According to an embodiment of the present inventive concept, a length W of the reference region REF, in a direction perpendicular to the reference direction (i.e., the second direction (Y)), may be determined to be greater than a length of a short-range interaction due to an optical proximity effect. Since a second length d may be determined to be smaller than the length of the short-range interaction, the length W of the reference region REF may have a value greater than the second length d.

In a case in which the length W of the reference region has a value greater than the second length d, even in the case that portions of a fine pattern are cut from the unit regions by the partitioning of the original layout, when reference data is added to the unit regions, the cut portions of the fine pattern may be merged again. Therefore, in the target regions, the fine pattern may not be arbitrarily cut, and a shape of the fine pattern may be maintained. Since the shape of the fine pattern, which may be greatly affected by an optical proximity effect, may be maintained in the target regions, even in the case that the target regions may be independently retargeted, an effect of the optical proximity effect may be normally reflected in each of the target regions.

Referring to FIG. 5 again, after the target regions are generated, the retargeting operations of S201 to S206 described with reference to FIG. 3 may be performed in each of the target regions in parallel (S23). In parallel with S21 to S23, an auxiliary operation of adding dummy patterns to the original layout may be further performed (S24). And, the retargeted regions in S23 may be merged, and the added patterns in S24 may be further merged, to generate a correction layout (S25). The dummy patterns may refer to patterns supporting layout patterns such that the layout patterns are not damaged when a chemical-mechanical polishing (CMP) operation is performed in a process of generating a semiconductor chip.

Figure 8:
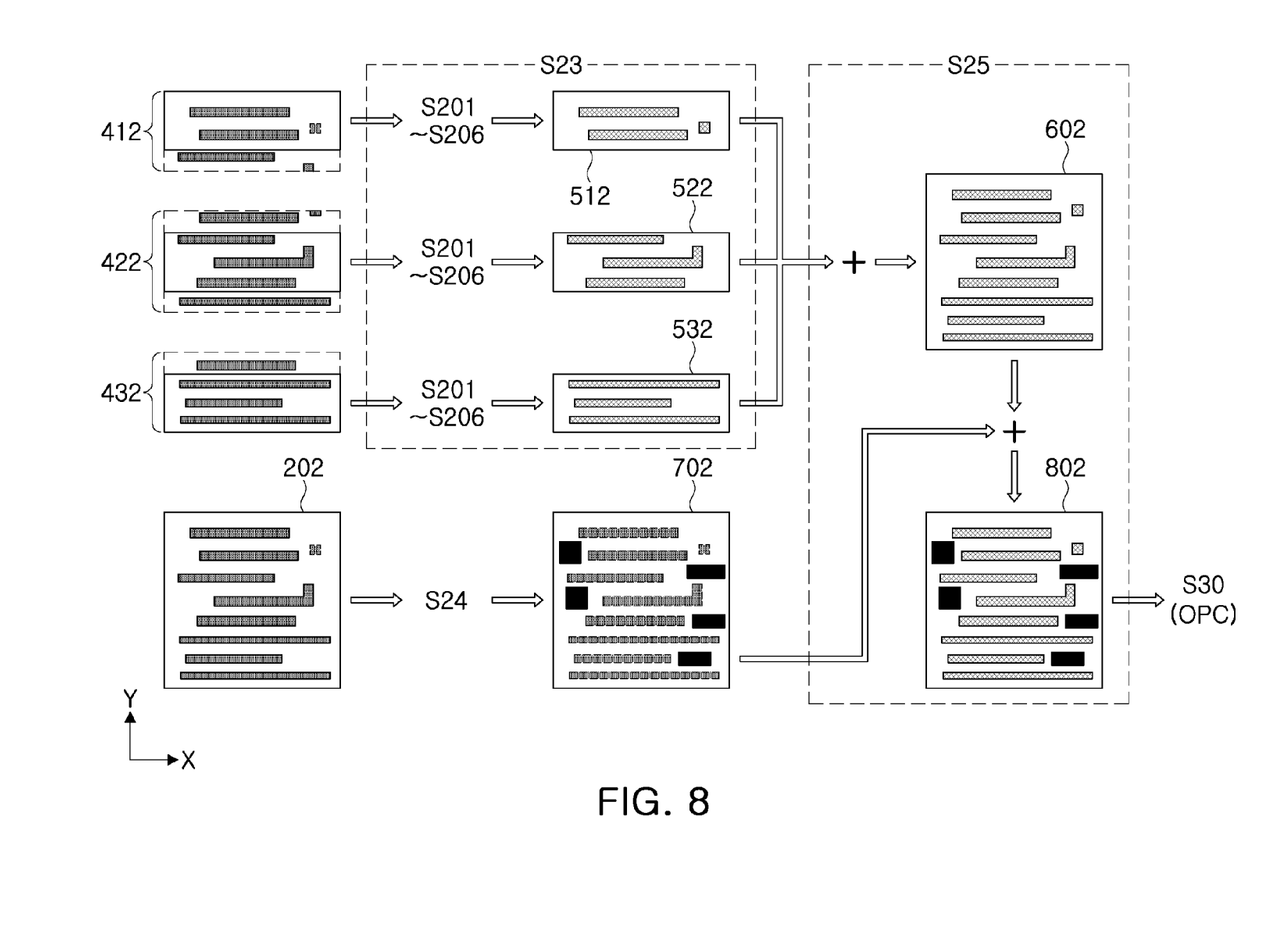

FIG. 8 is a view illustrating in detail S23 to S25 according to an embodiment of the present inventive concept.

Referring to FIG. 8, the retargeting operations described with reference to S201 to S206 may be respectively performed in parallel in target regions 412, 422, and 432, to generate retargeted regions 512, 522, and 532 (S23). For example, patterns may be corrected in consideration of a long-range interaction and a short-range interaction between the patterns in each of the target regions 412, 422, and 432.

An auxiliary operation of adding a dummy pattern to the original layout 202 may be performed in parallel with the retargeting operation (S24). In FIG. 8, a dummy layout 702 is illustrated to include dummy patterns formed around the patterns of the original layout 202.

Referring to FIG. 8, the dummy patterns may be formed around the patterns of the original layout. In the dummy layout 702, the patterns of the original layout are illustrated to have broken lines, and the dummy patterns are illustrated to have solid lines.

Even in the case that an error due to the optical proximity effect occurs in the dummy patterns, performance of a semiconductor chip generated based on a layout including the dummy patterns may be only slightly affected. Therefore, the auxiliary operation of adding the dummy pattern may be executed in parallel with the retargeting operation.

A layout 602 in which the retargeted regions 512, 522, and 532 are merged may be generated, and the merged layout 602 and the dummy layout 702 may be merged to generate a correction layout 802 (S25). Hereinafter, an OPC operation S30 and the like, as described with reference to FIG. 2, may be performed on the correction layout 802, to generate a final layout.

According to the embodiment of the present inventive concept described with reference to FIGS. 5 to 8, to design a layout mainly having patterns extending in a reference direction, a fine pattern having a length smaller than a first length in the reference direction may be subjected to a restriction rule applied in a direction, perpendicular to the reference direction. When an original layout designed under the restriction rule is partitioned in the reference direction to generate unit regions, and reference data is added to the unit regions to generate target regions, a fine pattern may be completely included in one or more target regions without cutting the fine pattern in the unit regions. Therefore, an optical proximity effect may be accurately reflected on fine patterns in the target regions.

Figure 9A:
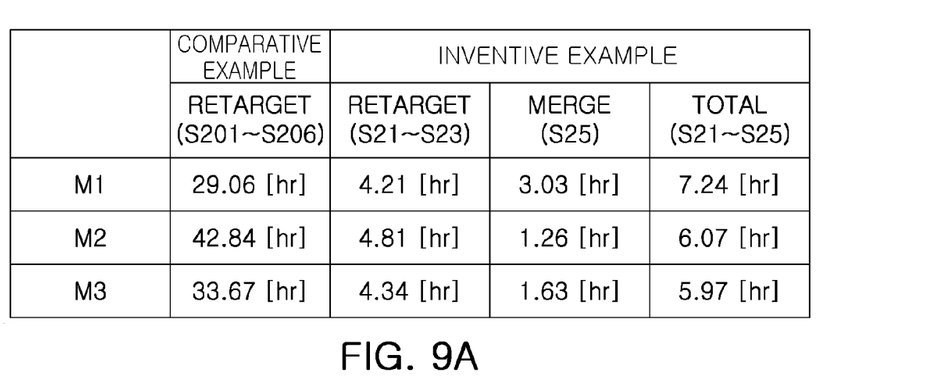
FIGS. 9A and 9B are views illustrating and comparing a turnaround time (TAT) according to an inventive example and a comparative example.
Figure 9B:
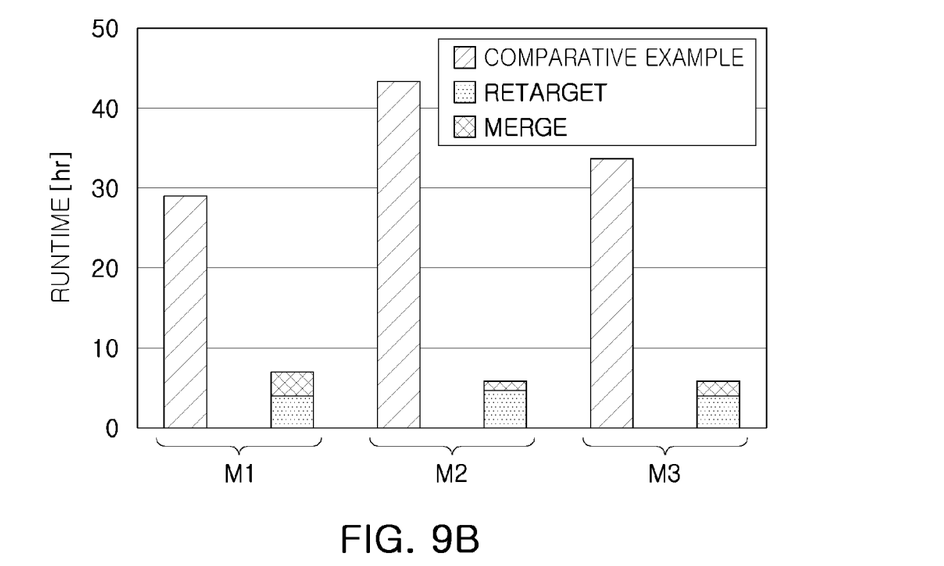

FIGS. 9A and 9B are views illustrating and comparing a turnaround time (TAT) according to an inventive example and a comparative example. Specifically, FIG. 9A illustrates retargeting experimental data according to the embodiment of the present inventive concept and a comparative example for a plurality of metal layers M1, M2, and M3, respectively, in a table format. FIG. 9B illustrates the same experimental data in a graph format.

Retargeting time according to the embodiment may refer to a time required to partition the original layout designed according to the restriction rule to generate the target region, as in S21 to S25 of FIG. 5, and perform then the retargeting operation of S201 to S206 for each of the target regions, in parallel, in the reference direction. For example, the retargeting time may refer to time required when a retargeting operation is performed in parallel by generating 10 target layouts based on the original layout.

Retargeting time according to the comparative example may refer to a time required to perform the retargeting operation of S201 to S206 of FIG. 3, using the entire original layout region as the target region, without dividing the layout.

When the retargeting time according to the embodiment and the retargeting time according to the comparative example are compared for each of the metal layers M1, M2, and M3, the retargeting time according to the embodiment may be shorter than the retargeting time according to the comparative example.

For example, the retargeting time according to the comparative example for the first metal layer M1 may be 29.06 [hours]. According to the embodiment, a layout of the first metal layer M1 designed according to the restriction rule in S21 to S23 may be partitioned, and a retargeting operation may be performed in parallel for each partitioned region. A time required for S21 to S23 may be 4.21 [hours], which may be only about 14% of the retargeting time according to the comparative example. An operation of S24 not illustrated in FIG. 9A may be performed at the same time that S21 to S23 are performed.

According to the embodiment, to complete a correction layout, regions on which the retargeting operation has been performed should be merged, and an additional time of 3.03 hours may be required when a merging operation of S25 is performed in the first metal layer M1. Even in the case that a time for which the retargeting operation is performed may be added to the time for which the retargeting operation has been performed, a total TAT may be 7.24 hours, which may be only 25% of the TAT according to the comparative example. Referring to FIGS. 9A and 9B, in the first metal layer M1 as well as in the second and third metal layers M2 and M3, it can be seen that a TAT according to the embodiment may be significantly shortened compared to a TAT according to the comparative example. Therefore, according to an embodiment of the present inventive concept, retargeting time may be shortened, and as a result, a TAT of a mask data preparation operation may be shortened.

According to an embodiment of the present inventive concept, parallelism of a retargeting operation may be improved, and a turnaround time (TAT) of mask data preparation may be shortened.

Problems to be solved by the present inventive concept are not limited to the problems mentioned above, and other problems not mentioned will be clearly understood by those skilled in the art from the following description.

While example embodiments have been illustrated and described above, it will be apparent to those skilled in the art that modifications and variations could be made without departing from the scope of the present inventive concept as defined by the appended claims.

What is claimed is:

1. A layout method of a semiconductor chip, comprising:
designing a layout using a restriction rule such that a layout pattern having a length smaller than a first length in a first direction has to have a length smaller than a second length in a second direction, the second direction intersecting the first direction;
generating a plurality of unit regions by partitioning the layout in the first direction;
generating a plurality of target regions by adding a reference region to a partitioned edge of each of the plurality of unit regions;
retargeting the plurality of target regions in parallel; and
generating a correction layout by merging the plurality of retargeted target regions.

2. The layout method of claim 1,
wherein the retargeting of the plurality of target regions in parallel comprises correcting shapes and positions of metal patterns to reduce an error due to an optical proximity effect in an exposure process.

3. The layout method of claim 1,
wherein the first length is determined based on an exposure wavelength used in an exposure process.

4. The layout method of claim 3,
wherein the first length is equal to twice the exposure wavelength.

5. The layout method of claim 1,
wherein the second length is determined to have a length, smaller than a short-range interaction distance, which is a distance that causes an optical proximity effect between adjacent patterns of the layout pattern.

6. The layout method of claim 1,
wherein the reference region comprises at least a portion of a unit region adjacent to a partitioned edge of one unit region among the plurality of unit regions.

7. The layout method of claim 1,
wherein the reference region has a length greater than the second length in the second direction.

8. The layout method of claim 1,
wherein the reference region has a length, greater than a short-range interaction distance, which is a distance that causes an optical proximity effect between adjacent patterns.

9. The layout method of claim 1,
wherein the generating of the plurality of target regions comprises adding the reference region such that the layout pattern having the length smaller than the first length in the first direction is completely included in at least one target region among the plurality of target regions.

10. The layout method of claim 1, further comprising adding a dummy pattern for chemical-mechanical polishing (CMP) to the layout,
wherein the adding of the dummy pattern is performed in parallel with the generating of the plurality of unit regions, the generating of the plurality of target regions, and the retargeting of the plurality of target regions in parallel.

11. The layout method of claim 10,
wherein the generating of the correction layout comprises further merging the dummy pattern into the plurality of retargeted target layout regions.

12. The layout method of claim 1,
wherein the first and second directions are perpendicular to each other.

13. The layout method of claim 1,
wherein the retargeting of the plurality of target regions in parallel comprises:
checking whether connected patterns are included in each of the plurality of target regions;
determining a hierarchical structure such that the connected patterns belong to a single lower region or a single upper region in each of the plurality of target regions;
partitioning each of the plurality of target regions into an upper region and a lower regions based on the determined hierarchical structure, and adding a reference frame to the upper region and the lower regions;
generating correction regions by performing an operation for a long-range interaction between patterns for the upper region and the lower regions to which the reference frame is added; and
generating sub-regions by partitioning each of the correction regions based on a region, and correcting patterns of the sub-regions by performing an operation for a short-range interaction between the patterns of the sub-regions.

14. A method for manufacturing a semiconductor chip, comprising:
designing layouts of layers of the semiconductor chip using a restriction rule such that a layout pattern having a length smaller than a first length in a reference direction has to have a length smaller than a second length in a direction perpendicular to the reference direction;
generating correction layouts by partitioning each of the layouts in the reference direction, retargeting partitioned regions in parallel, and merging the retargeted partitioned regions;
generating final layouts by performing optical proximity correction (OPC) and fracturing on the correction layouts, and preparing masks of the layers using the final layouts; and
manufacturing the semiconductor chip using the masks.

15. The method of claim 14,
wherein reference directions of at least a portion of the layouts are different from each other.

16. The method of claim 15,
wherein reference directions of adjacent layouts among the layouts are perpendicular to each other.

17. The method of claim 14,
wherein the preparing of the masks of the layers using the final layouts comprises:
performing an exposure process on a mask substrate based on mask data for the final layouts; and
performing a developing process, an etching process, or a cleaning process, after the exposure process.

18. A computing device for retargeting a layout of a semiconductor chip, comprising:
a memory storing at least one instruction; and
a processor including a plurality of processing cores,
wherein the processor is configured to:
use a restriction rule that limits a length of a layout pattern in a first direction to design the layout,
partition the layout in a second direction, intersecting the first direction, to generate a plurality of target regions, and
retarget each of the plurality of target regions in parallel, and
wherein the processor is configured further to correct, during the retargeting of each target region of the plurality of target regions, shapes and positions of metal patterns to reduce an error due to an optical proximity effect in an exposure process.

19. The computing device of claim 18,
wherein the restriction rule comprises a rule such that the layout pattern having a length smaller than a first length in the second direction has to have a length smaller than a second length in the first direction.

20. The computing device of claim 19,
wherein the processor is further configured to add a reference region including at least a portion of adjacent unit regions to each unit region of a plurality of unit regions partitioned in the second direction, to generate the plurality of target regions.

* * * * *